(12) United States Patent
Mayhew et al.

(10) Patent No.: US 7,196,491 B2
(45) Date of Patent: Mar. 27, 2007

(54) SYSTEM AND METHOD FOR STALL DETECTION OF A MOTOR

(75) Inventors: Scott Mayhew, N. Aurora, IL (US); Scott Wakefield, Plano, IL (US); Daniel Zuzuly, Geneva, IL (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 44 days.

(21) Appl. No.: 10/770,687

(22) Filed: Feb. 2, 2004

(65) Prior Publication Data

US 2004/0155622 A1    Aug. 12, 2004

Related U.S. Application Data

(60) Provisional application No. 60/446,940, filed on Feb. 12, 2003.

(51) Int. Cl.
   H02P 1/26      (2006.01)
   H02P 5/28      (2006.01)
   B66B 13/08     (2006.01)

(52) U.S. Cl. ............... 318/778; 318/799; 187/29 R (58) Field of Classification Search .......... 318/778, 318/430, 811, 799, 809, 807, 729, 786, 254, 318/727, 431; 388/937
See application file for complete search history.

(56) References Cited

U.S. PATENT DOCUMENTS

| | | | | |
|---|---|---|---|---|
| 4,097,788 A * | 6/1978 | Nygaard et al. | ............ | 318/271 |
| 4,322,668 A * | 3/1982 | Trussler et al. | ............ | 318/434 |
| 4,355,274 A * | 10/1982 | Bourbeau | ............ | 318/812 |
| 4,379,258 A * | 4/1983 | Sugimoto | ............ | 318/805 |
| 4,454,459 A * | 6/1984 | Huber | ............ | 388/811 |
| 4,459,529 A * | 7/1984 | Johnson | ............ | 318/729 |
| 4,598,354 A | 7/1986 | Kindler et al. | ............ | 364/174 |
| 4,634,951 A * | 1/1987 | Kampf et al. | ............ | 318/778 |
| 4,636,702 A * | 1/1987 | Hedges | ............ | 318/729 |
| 4,689,543 A * | 8/1987 | Hucker | ............ | 318/798 |
| 4,767,975 A * | 8/1988 | Unsworth | ............ | 318/729 |
| 4,804,901 A * | 2/1989 | Pertessis et al. | ............ | 318/786 |
| 4,859,924 A * | 8/1989 | Chonan | ............ | 318/808 |
| 4,931,715 A * | 6/1990 | Lee et al. | ............ | 318/709 |
| 4,998,163 A * | 3/1991 | Salvati | ............ | 348/270 |
| 5,008,608 A * | 4/1991 | Unsworth et al. | ............ | 318/729 |
| 5,017,846 A * | 5/1991 | Young et al. | ............ | 318/244 |
| 5,151,642 A * | 9/1992 | Lombardi et al. | ............ | 318/779 |
| 5,191,270 A * | 3/1993 | McCormack | ............ | 318/254 |
| 5,241,256 A * | 8/1993 | Hatanaka et al. | ............ | 318/801 |
| 5,296,795 A * | 3/1994 | Dropps et al. | ............ | 318/778 |
| 5,304,911 A * | 4/1994 | Anderson | ............ | 318/729 |
| 5,327,052 A * | 7/1994 | Sakurai et al. | ............ | 318/254 |

(Continued)

FOREIGN PATENT DOCUMENTS

DE           4413802 A1      11/1995

*Primary Examiner*—Paul Ip (57) ABSTRACT

A motor starter system comprises solid state switches for connection between an AC line and motor terminals for controlling application of AC power to the motor. A voltage sensor senses AC line voltage and the motor terminal voltage. Current sensors sense motor current. A control circuit controls operation of the solid state switches. The control circuit limits switch current during a start mode and detects a stall condition responsive to sensed AC line voltage and motor terminal voltage and selectively boosts motor current during the start mode if a stall condition is detected.

24 Claims, 5 Drawing Sheets

U.S. PATENT DOCUMENTS

| | | | |
|---|---|---|---|
| 5,341,080 A * | 8/1994 | Agut Sanz | 318/778 |
| 5,363,028 A * | 11/1994 | Mori | 318/599 |
| 5,442,271 A * | 8/1995 | Hatanaka et al. | 318/729 |
| 5,451,846 A * | 9/1995 | Peterson et al. | 318/254 |
| 5,473,241 A * | 12/1995 | Chen et al. | 318/807 |
| 5,488,281 A | 1/1996 | Unsworth et al. | 318/806 |
| 5,528,120 A * | 6/1996 | Brodetsky | 318/785 |
| 5,565,753 A * | 10/1996 | Chen et al. | 318/809 |
| 5,684,377 A * | 11/1997 | Kim et al. | 318/799 |
| 5,844,397 A * | 12/1998 | Konecny et al. | 318/811 |
| 5,859,514 A * | 1/1999 | Chouffier et al. | 318/432 |
| 5,909,098 A * | 6/1999 | Konecny et al. | 318/811 |
| 6,028,402 A * | 2/2000 | Kumar et al. | 318/52 |
| 6,034,494 A * | 3/2000 | Kitamine et al. | 318/254 |
| 6,160,365 A * | 12/2000 | Younger et al. | 318/16 |
| 6,163,129 A * | 12/2000 | Younger et al. | 318/799 |
| 6,201,369 B1 * | 3/2001 | Johnson | 318/811 |
| 6,479,958 B1 * | 11/2002 | Thompson et al. | 318/430 |
| 6,489,742 B2 * | 12/2002 | Lumsden | 318/727 |
| 6,586,905 B1 * | 7/2003 | Johnson | 318/778 |
| 6,590,361 B2 * | 7/2003 | Walters et al. | 318/727 |
| 6,593,716 B1 * | 7/2003 | Lange et al. | 318/471 |
| 6,737,827 B2 * | 5/2004 | Cashatt | 318/727 |
| 6,756,756 B1 * | 6/2004 | Chmiel et al. | 318/430 |
| 6,841,954 B2 * | 1/2005 | Nakabayashi | 318/62 |
| 6,954,046 B2 * | 10/2005 | Cashatt | 318/432 |
| 2002/0079859 A1 * | 6/2002 | Lumsden | 318/727 |
| 2002/0190686 A1 * | 12/2002 | Cashatt | 318/727 |
| 2003/0015989 A1 * | 1/2003 | Walters et al. | 318/727 |
| 2003/0020432 A1 * | 1/2003 | Sakai et al. | 318/801 |
| 2004/0056629 A1 * | 3/2004 | Maeda et al. | 318/719 |
| 2004/0174134 A1 * | 9/2004 | Cashatt | 318/727 |

* cited by examiner

SYSTEM AND METHOD FOR STALL DETECTION OF A MOTOR

CROSS REFERENCE TO RELATED PATENT APPLICATIONS

This application claims priority of Provisional Application No. 60/446,940, filed Feb. 12, 2003.

FIELD OF THE INVENTION

This invention relates to a motor controller and more particularly, a system and method for stall detection of a motor.

BACKGROUND OF THE INVENTION

Solid state starters/controllers have found widespread use for controlling application of power to an AC induction motor. The conventional starter/controller, referred to hereinafter as simply a starter or a controller, uses solid state switches for controlling application of AC line voltage to the motor. The switches may be thyristors such as silicon controlled rectifiers (SCRs) or triacs.

One application for a motor controller is as an elevator starter. The elevator starter may be used to drive a pump for an hydraulic elevator. Each time movement of an elevator car is commanded, then the starter must start the motor until it reaches operating speed and then operate in a run mode. Such a starter may only be used for the up direction as gravity may be used for the down direction.

One type of elevator starter initially connects the motor windings in a Y-configuration to start the motor and bring it up to speed. Then the windings are reconnected in a delta configuration with full voltage. Other starters, referred to as soft starters, change the on time of the solid state switches to control voltage and to ramp up motor current with a fixed connection. Known elevator starters have selector switches for setting a starting current limit setting. Depending on configuration, the setting is adjustable from about 100 percent to 450 percent of the starter's current rating. The time required to bring a motor up to speed with a current limit start is a function of the difference in the torque provided at the current limit setting and the torque required to accelerate the load or pump. As a general rule, the higher the current limit setting the lower the start time and conversely, the lower the current limit setting the longer the start time. In an elevator application end users are interested in starting the motor as fast as possible.

In applications where the load during the start is light and doesn't vary from start to start, for example a hydraulic elevator motor, current limit is generally the preferred method to start the motor. However, if the torque required to start the load or pump increases, then the start time will increase. Depending on the torque required to start the load or pump, it may take an unsuitably long time to get the motor up to speed. To compensate for this time delay, known soft starters increase the motor start current past the current limit setting if the motor does not come up to speed in an allotted time. Some starters use a fixed time or a variable time based on the average start time. The delay time enables the rotor to accelerate up to the appropriate speed before additional current boost is given under normal conditions. This routine works well when the torque is sufficient to allow the rotor to continue to accelerate during the allotted time frame. If the load is not up to speed in the allotted time, then the boost provided when the starter increases the current typically brings the rotor up to speed. However, there can be exceptions that result in failure of the motor start operation.

As long as the torque provided by the current limit setting remains higher than the torque required to accelerate the load or pump throughout the torque curve, the motor will continue to accelerate until it increases to an appropriate speed. If at any time during the start operation the torque provided by the current limit setting is equal to the torque required to accelerate the load, then the motor will no longer be able to accelerate and will remain at constant speed until the current boost algorithm is implemented. During this time the motor will continue to spin at the "stalled" speed. In applications where the starting current is around 200% of the motor's full load current, the average start time may exceed 2 to 2.5 seconds. This can result in a delay of up to 5 seconds before the starter begins to boost the current in an effort to bring the motor up to speed. The time spent in the delay is wasted as the motor is spinning at the same low speed when the time delay expires as it was when the stalled condition was encountered, regardless of the length of the delay.

The present invention is directed to solving one or more of the problems discussed above, in a novel and simple manner.

SUMMARY OF THE INVENTION

In accordance with the invention there is provided a system and method for stall detection of a motor.

Broadly, there is disclosed herein a motor controller system comprising solid state switches for connection between an AC line and motor terminals for controlling application of AC power to the motor. A current sensor senses motor current. A voltage sensor senses voltage. A control circuit controls operation of the solid state switches. The control circuit limits switch current during a start mode and detects a stall condition responsive to sensed voltage and selectively boosts motor current during the start mode if a stall condition is detected.

It is a feature of the invention that the voltage sensor senses RMS voltage.

It is another feature of the invention that the voltage sensor senses instantaneous voltage for each winding of the motor and determines RMS motor voltage for each winding. The control circuit detects a stall condition using an average of the RMS motor voltage for each winding.

It is another feature of the invention that the control circuit varies firing of the solid state switches to control motor starting current.

It is an additional feature of the invention that the control circuit detects a stall condition if a difference in the sensed voltage after a select interval is less than a select threshold. The select interval is about ten electrical cycles.

There is disclosed in accordance with another aspect of the invention a motor starter system comprising solid state switches for connection between an AC line and motor terminals for controlling application of AC power to the motor. A voltage sensor senses AC line voltage and the motor terminal voltage. Current sensors sense motor current. A control circuit controls operation of the solid state switches. The control circuit limits switch current during a start mode and detects a stall condition responsive to sensed AC line voltage and motor terminal voltage and selectively boosts motor current during the start mode if a stall condition is detected.

There is disclosed in accordance with yet another aspect of the invention a motor starter system comprising solid state switch means for connection between an AC line and motor terminals for controlling application of AC power to the motor. Voltage sensing means sense motor winding voltage. Current sensing means sense motor current. Start control means are operatively connected to the voltage sensing means and the current sensing means for controlling operation of the solid state switch means during a start mode. The start control means limits switch current during the start mode and detects a stall condition responsive to sensed motor winding voltage and selectively boosts motor current during the start mode if a stall condition is detected.

There is disclosed in accordance with still a further aspect of the invention a method of detecting a stall condition during motor starting comprising: providing solid state switches for connection between an AC line and motor terminals for controlling application of AC power to the motor; sensing motor voltage; sensing motor current; controlling operation of the solid state switches during a start mode to limit switch current during the start mode; detecting a stall condition responsive to sensed motor voltage; and boosting motor current during the start mode if a stall condition is detected.

Further features and advantages of the invention will be readily apparent from the specification and from the drawings.

DETAILED DESCRIPTION OF THE INVENTION

Figure 1:
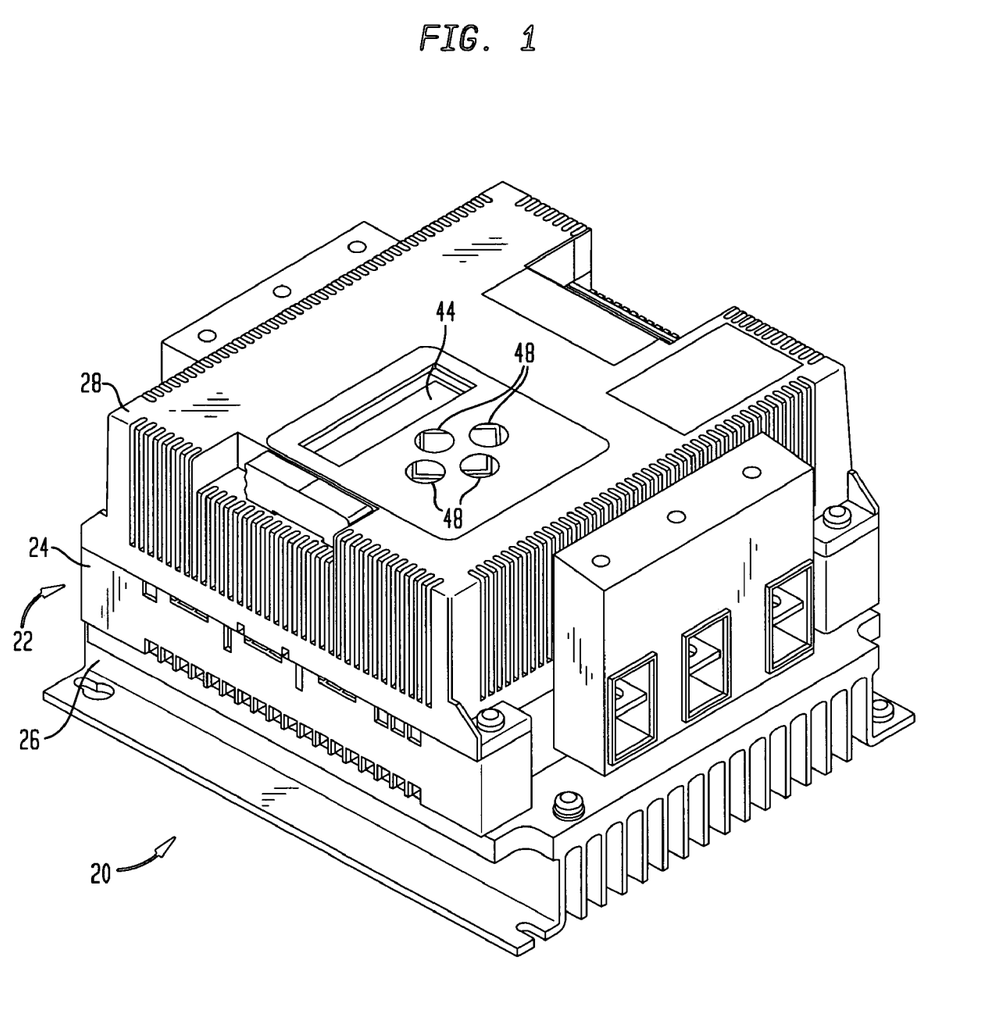
FIG. 1 is a perspective view of a motor controller in accordance with the invention.

Referring initially to FIG. 1, a solid state motor starter/controller 20, referred to hereinafter as simply a starter or a controller, is illustrated. One application for the controller 20 is as an elevator starter. The motor controller 20 may be used to drive a pump for an hydraulic elevator. Each time movement of an elevator car is commanded, the motor controller 20 must start the elevator motor until it reaches operating speed and then operate in a run mode. Such a motor controller 20 may only be used for the up direction as gravity may be used for the down direction.

The motor controller 20 comprises a housing 22 including a housing base 24, a heat sink 26 and a cover 28. The motor controller 20 includes a plurality of solid state switches 32 in the form of thyristors, such as back to back connected silicon controlled rectifier (SCR) pairs, see FIG. 2. For simplicity herein, the SCR pairs 32 are referred to as simply SCRs. Triacs could also be used. The SCRs 32 control application of three phase AC line voltage to a three phase motor. As is apparent, a different number of SCRs 32 could be used to control different numbers of phases, as is apparent to those skilled in the art.

Figure 2:
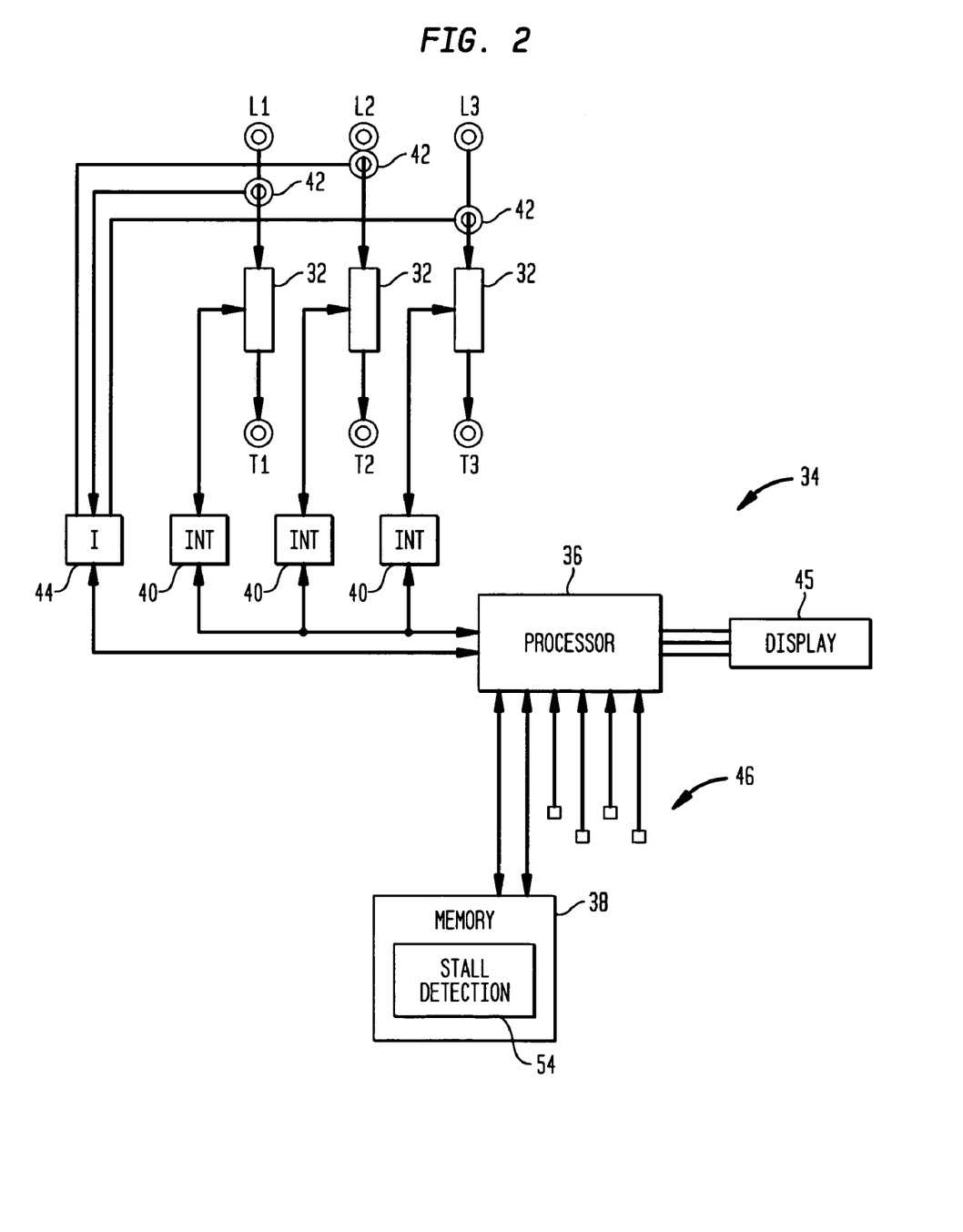
FIG. 2 is a block diagram of the motor controller of FIG. 1.

The SCRs 32 are mounted to the heat sink 26 within the housing 20. Referring also to FIG. 2, a control circuit 34 is also enclosed in the housing 20. The control circuit 34 controls operation of the SCRs 32. Particularly, the control circuit 34 includes a programmed processor 36, such as a digital signal processor, for commanding operation of the SCRs 32. A memory 38 is connected to the processor 36 and stores programs and configuration information relating to operation of the SCRs 32, as described below. As is apparent, the processor 36 may include program memory storing some or all of the programs and configuration information.

The processor 36 is connected to three interface circuits 40 each for connection to one of the SCRs 32. Particularly, the interface circuits 40 comprise snubber circuits for driving the SCRs 32 and voltage sense circuits for sensing line voltage and motor terminal voltage. A current transformer 42 senses current of each of the SCRs 32 and is connected to a current sense circuit 44. Other types of current sensors could be used. The current sense circuit 44 is also connected to the processor 36.

An LCD display 45 on the cover 22, see FIG. 1, is connected to the processor 36. The display 45 is used to indicate configuration settings, operating values, fault conditions, and the like. User actuable switches 46 are electrically connected to the processor 36. The user actuable switches 46 are actuated by actuator elements 48 on the housing cover 22, see FIG. 1. Particularly, the switches 46 are used for locally selecting parameters for stored configuration information.

Figure 3:
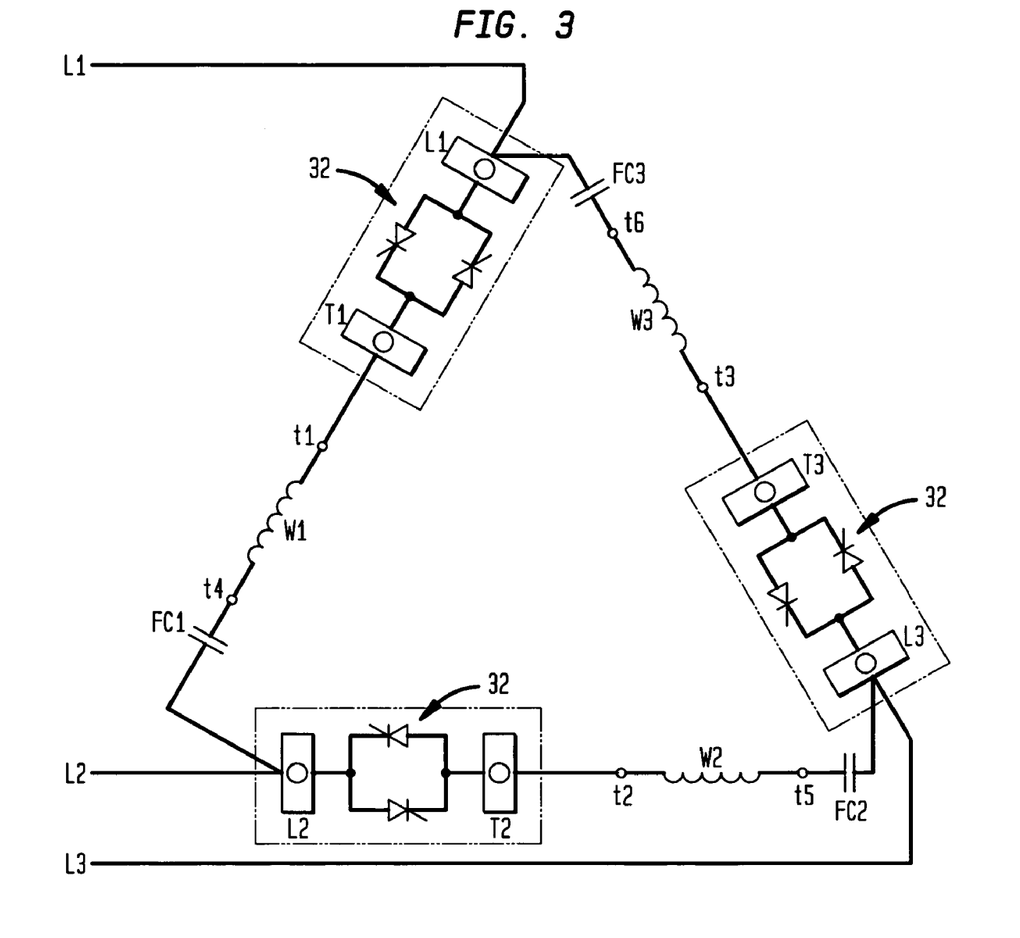
FIG. 3 is a wiring diagram of the motor controller of FIG. 1 connected to a motor in a delta configuration.

Referring to FIG. 3, an electrical schematic illustrates connection of the SCRs 32 of FIG. 2 to motor windings in a typical delta configuration. The terminals of the motor are referenced by a "t". All terminals of the controller 20 are referenced by "T" and "L" designations. Thus, each SCR 32 is connected between a pair of controller terminals, such as the terminals L1 and T1. For example, one of the SCRs 32 is connected between the first phase line voltage L1 and the first motor terminal t1. The first motor winding W1 is connected in series with the SCR 32 between the motor terminal t1 and another motor terminal t4. A fault contact FC1 is also connected in series. The other legs of the delta configuration are generally similar and are conventional in nature. As is apparent, other motor configurations could be used in connection with the disclosed system and method.

Figure 4:
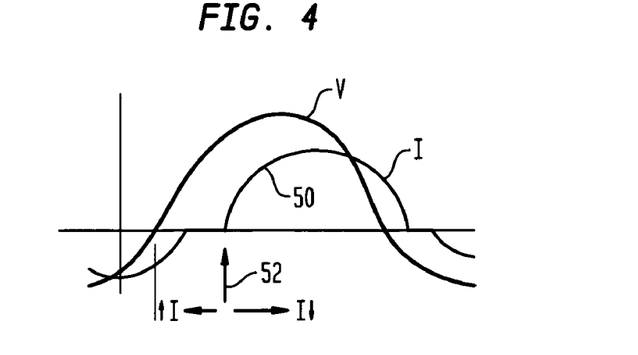
FIG. 4 is a curve illustrating current control for the SCRs of the motor controller.

The processor 36 of FIG. 2 operates in accordance with a control program for controlling operation of the SCRs 32. Particularly, each SCR 32 is conventionally controlled to satisfy voltage and current requirements. This is done by altering the firing angle of the SCRs 32. FIG. 4 shows a graphical illustration including a line curve 50 representing input current. A vertical arrow 52 represents firing angle of the SCRs 32. As is conventional, the firing angle 52 is controlled by the processor 36 to satisfy operating requirements. To lower current the firing angle 52 would be moved to the right in FIG. 4 to decrease conduction time. Conversely, to increase current the firing angle 52 would be moved to the left to increase conduction time, as is well known. During start mode, the processor 36 ramps the current up by gradually advancing the firing angle 52 in a time specified to satisfy preselect acceleration time and acceleration torque values up to a select starting current limit setting value. By adjusting the delay in firing the SCRs 32, the processor 36 can maintain this level. As the motor speed increases, the current begins to decrease. The processor 36 continually increases the voltage to offset the reduction in current. This maintains a constant current at the setting of the starting current limit switch. Subsequently during a run mode the control circuit 34 applies full voltage to the motor.

In accordance with the invention, the control program implements a novel system and method of immediately recognizing a stall condition and implementing a boost algorithm without waiting for a delay to transpire.

There are several different methods that could be used to sense if a motor has entered a stall condition during the start and is no longer accelerating. One solution is to monitor the time between a zero crossing of line voltage and the firing of the SCR. This time period is referred to as the "off delay". If the off delay does not change while the sensed current remains constant during the start mode, it can be assumed that the motor is no longer accelerating and is in a stall condition. However, if the incoming line voltage fluctuates during the start, the off delay will not remain constant. Two examples of situations where the incoming voltages may fluctuate are brown out conditions and when operating on generator power.

Another solution is to monitor the actual motor voltage and motor current. If at a constant current the motor voltage is not changing, then the motor is in a stall condition. Monitoring motor voltage eliminates the variances associated with the off delay method as the starter continually adjusts the voltage going to the motor to keep the current at the desired setting. If a voltage dips, such as during a brown out condition, then the off delay will decrease as the starter maintains the motor voltage. If a generator increases the voltage as it begins to recover from an increased load, then the starter may actually increase the firing delay. In either instance with a stall condition, the motor voltage will remain approximately equal.

In accordance with the invention, the control program compares the average of the three RMS motor winding voltages at a predetermined interval to determine if a motor is in a stall condition. If the difference between two consecutive sensed voltages is less than a predetermined amount, then it is determined that the motor is in a stall condition and the current boost is immediately implemented.

As discussed above, the control circuit 34 senses motor current using the current sensors 42 and the current sense circuit 44. The interface circuits 40 sense the voltages at the SCR terminals L1, L2 and L3 on the line side and the terminals T1, T2 and T3 on the motor side. By taking the difference between the T1 voltage and the L2 voltage when the fault contactor is closed, the instantaneous voltage can be derived for the first winding W1 connected between the motor terminals t1 and t4. Likewise, the instantaneous voltage for the second winding W2 can be derived by looking at the T2 and L3 voltages and the instantaneous voltage for the third winding W3 can be derived by looking at the voltage between the terminals T3 and L1. The instantaneous voltage for each winding W1–W3 is used to calculate the RMS voltage for each winding. The average of the RMS voltages for the three windings W1–W3 is used to detect a stall condition.

In accordance with the invention, the control circuit 34 utilizes a stall detection module 54, see FIG. 2, to immediately recognize a stall condition and implement a boost current algorithm during a start mode.

Figure 5:
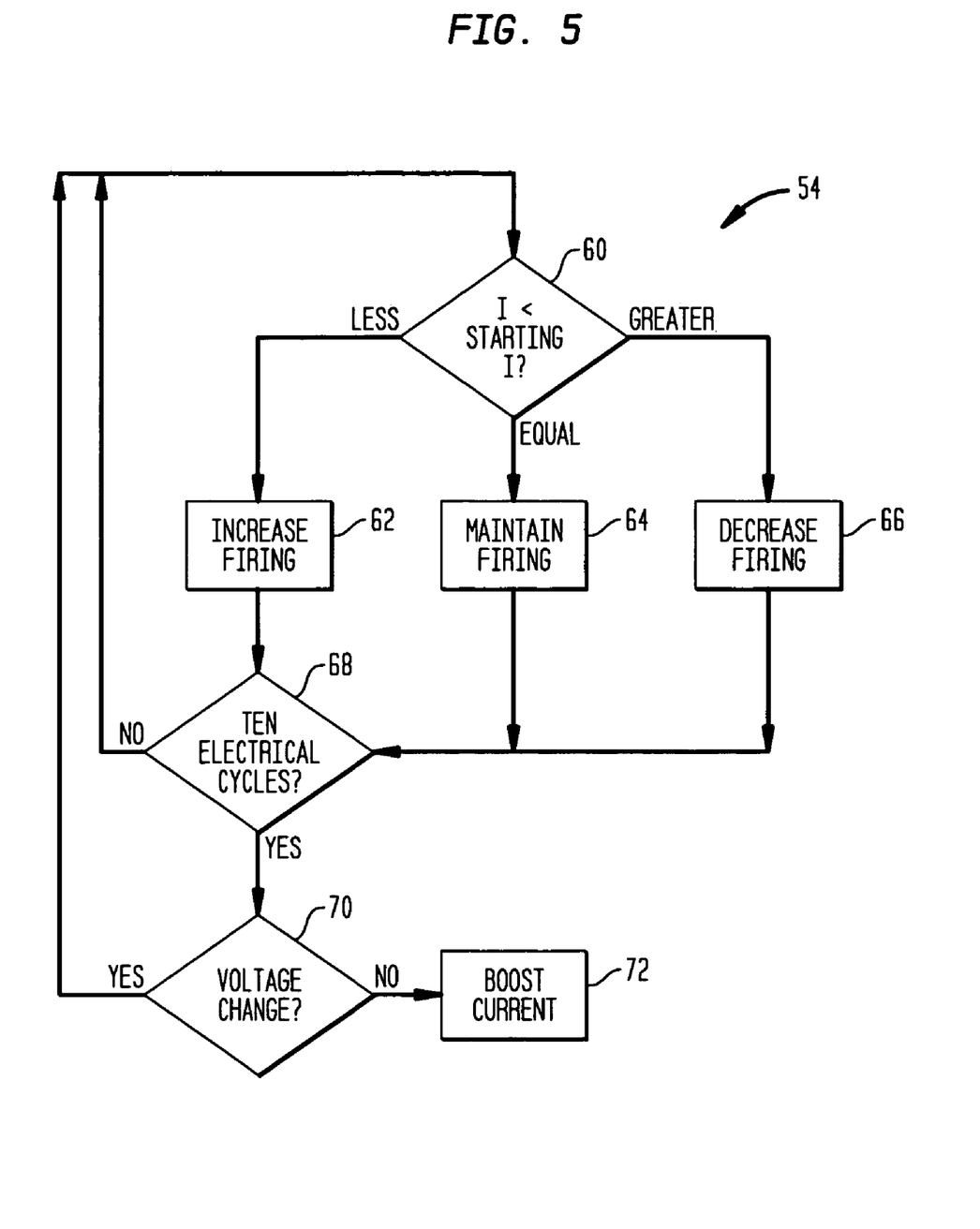
FIG. 5 is a flow diagram illustrating a stall detection module implemented by the processor of FIG. 2.

Referring to FIG. 5, a flow diagram illustrates the program for the stall detection module 54. The module 54 is implemented during each time starting operation is commanded by the processor 36. As will be apparent, the motor start operation includes conventional programming for selecting current limit values and a ramping operation. Those programs are conventional in nature and are not discussed in detail herein.

The module 54 begins at a decision block 60 which determines if the current sensed by the current sense circuit 44, representing motor current, is less than a commanded starting current. If the sensed current is less than the commanded starting current, then a block 62 increases firing, as discussed above relative to FIG. 4, to increase current. If the sensed current is equal to the commanded starting current, then the firing is maintained at a block 64. If the sensed current is greater than the commanded starting current, then firing is decreased at a block 66 to lower current, again as discussed above relative to FIG. 4.

From any of the blocks 62, 64 or 66, a decision block 68 determines if a select interval of time has passed since the last motor voltage comparison was made. In the illustrated embodiment of the invention, the select interval is ten electrical cycles. As is apparent, the interval could be a different interval or based on a set time, as will be apparent to those skilled in the art. If ten electrical cycles have not passed, then control returns to the decision block 60. If ten electrical cycles have passed, then a decision block 70 determines if there has been a voltage change. Particularly, the module 54 determines if the current value of the average RMS motor voltage, discussed above, is greater than the most recent value of the average RMS voltage by a select amount. If so, then there is no stall condition and the module returns to the decision block 60. If the voltage has not changed by the select threshold amount, then the module 54 detects a stall condition. In response to a stall condition, a conventional boost current algorithm is implemented at a block 72. For example, the boost current algorithm 72 may increase the current limit to 450% of rated current to bring the rotor up to speed.

Figure 6:
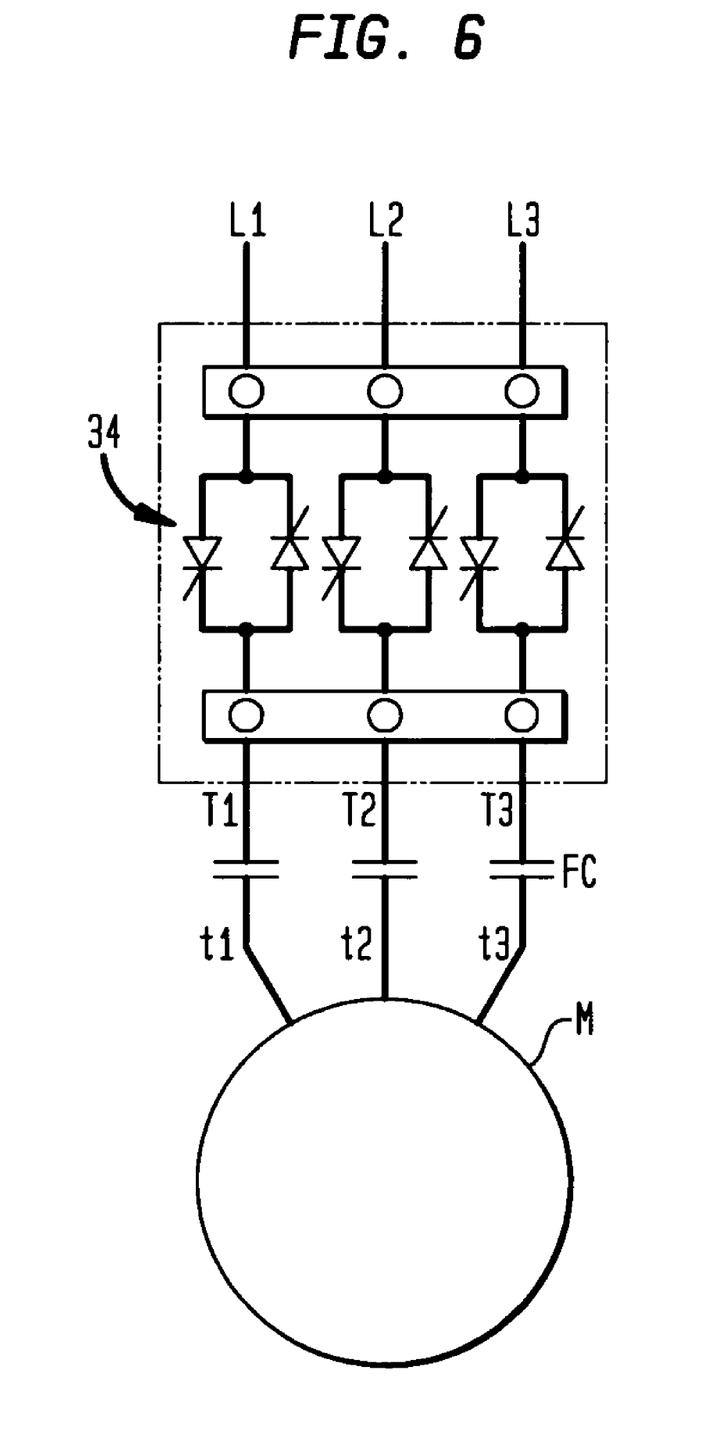
FIG. 6 is a wiring diagram for an alternative connection of the motor controller in line with a motor.

Referring to FIG. 6, an electrical schematic illustrates a portion of the control circuit 34 for connecting the starter in line with a motor M. In this application, the instantaneous motor winding voltages are taken from terminals T1 to T2, from T2 to T3, and from T3 to T1, to determine the RMS motor voltages in combined t1, t2 and t3 winding connections. An average of these voltages is used for the motor voltage calculation.

It can therefore be appreciated that a new and novel system and method for automatically detecting a stall condition and boosting start current in a motor controller has been described. It will be appreciated by those skilled in the art that, given the teaching herein, numerous alternatives and equivalents will be seen to exist which incorporate the disclosed invention. As a result, the invention is not to be limited by the foregoing exemplary embodiments, but only by the following claims.

We claim:

1. A motor controller system comprising:
   solid state switches for connection between an AC line and motor terminals for controlling application of AC power to the motor;
   current sensors for sensing motor current;
   a voltage sensor for sensing voltage; and
   a control circuit for controlling operation of the solid state switches, the control circuit limiting switch current during a start mode and detecting a stall condition responsive to sensed voltage and selectively boosting motor current during the start mode if a stall condition is detected.

2. The motor controller system of claim 1 wherein the voltage sensor senses RMS voltage.

3. The motor controller system of claim 1 wherein the voltage sensor senses instantaneous voltage for each winding of the motor and determines RMS motor voltage for each winding.

4. The motor controller system of claim 3 wherein the control circuit detects a stall condition using an average of the RMS motor voltage for each winding.

5. The motor controller system of claim 1 wherein the control circuit varies firing of the solid state switches to control motor starting current.

6. The motor controller system of claim 1 wherein the control circuit detects a stall condition if a difference in the sensed voltage after a select interval is less than a select threshold.

7. The motor controller system of claim 6 wherein the select interval is about ten electrical cycles.

8. A motor starter system comprising:
  solid state switches for connection between an AC line and motor terminals for controlling application of AC power to the motor;
  a voltage sensor for sensing AC line voltage and motor terminal voltage;
  current sensors for sensing motor current; and
  a control circuit for controlling operation of the solid state switches, the control circuit limiting switch current during a start mode and detecting a stall condition responsive to sensed AC line voltage and motor terminal voltage and selectively boosting motor current during the start mode if a stall condition is detected.

9. The motor starter system of claim 8 wherein the voltage sensor senses RMS motor voltage.

10. The motor starter system of claim 8 wherein the voltage sensor senses instantaneous voltage for each winding of the motor and determines RMS motor voltage for each winding.

11. The motor starter system of claim 10 wherein the control circuit detects a stall condition using an average of the RMS motor voltage for each winding.

12. The motor starter system of claim 8 wherein the control circuit varies firing of the solid state switches to control motor starting current.

13. The motor starter system of claim 8 wherein the control circuit detects a stall condition if a difference in the sensed motor voltage after a select interval is less than a select threshold.

14. The motor starter system of claim 13 wherein the select interval is about ten electrical cycles.

15. A motor starter system comprising:
  solid state switch means for connection between an AC line and motor terminals for controlling application of AC power to the motor;
  voltage sensing means for sensing motor winding voltage;
  current sensing means for sensing motor current; and
  start control means operatively connected to the voltage sensing means and the current sensing means for controlling operation of the solid state switch means during a start mode, the start control means limiting switch current during the start mode and detecting a stall condition responsive to sensed motor winding voltage and selectively boosting motor current during the start mode if a stall condition is detected.

16. The motor starter system of claim 15 wherein the voltage sensor sensing means senses instantaneous voltage for each winding of the motor and the start control means detects a stall condition using average RMS motor voltage.

17. The motor starter system of claim 15 wherein the start control means varies firing of the solid state switch means to control motor starting current.

18. The motor starter system of claim 15 wherein the start control means detects a stall condition if a difference in the sensed motor voltage after a select interval is less than a select threshold.

19. The motor starter system of claim 18 wherein the select interval is about ten electrical cycles.

20. A method of detecting a stall condition during motor starting comprising:
  providing solid state switches for connection between an AC line and motor terminals for controlling application of AC power to the motor;
  sensing motor voltage;
  sensing motor current;
  controlling operation of the solid state switches during a start mode to limit switch current during the start mode;
  detecting a stall condition responsive to sensed motor voltage; and
  boosting motor current during the start mode if a stall condition is detected.

21. The method of claim 20 wherein sensing motor voltage comprises sensing instantaneous voltage for each winding of the motor and detecting a stall condition is responsive to RMS motor voltage.

22. The method of claim 20 wherein detecting a stall condition comprise determining if a difference in the sensed motor voltage after a select interval is less than a select threshold.

23. The method of claim 22 wherein the select interval is about ten electrical cycles.

24. The method of claim 22 wherein the select interval is adjustable from about 1 to 1000 msec.

* * * * *